United States Patent [19]
Isono et al.

[11] Patent Number: 5,012,351
[45] Date of Patent: Apr. 30, 1991

[54] STEREOSCOPIC VIDEO DISC RECORD AND RECORDING AND REPRODUCING APPARATUS THEREFOR

[75] Inventors: Haruo Isono; Minoru Yasuda, both of Tokyo; Hiroshi Watanabe, Osaka; Tateo Toyama, Osaka; Toshiaki Hioki, Osaka; Yoshihiko Morita, Osaka; Makoto Yamada, Osaka, all of Japan

[73] Assignees: Nippon Hoso Kyokai; Sanyo Electric Co., Ltd., both of Japan

[21] Appl. No.: 243,558

[22] PCT Filed: Nov. 2, 1987

[86] PCT No.: PCT/JP87/00846
§ 371 Date: Jun. 28, 1988
§ 102(e) Date: Jun. 28, 1988

[87] PCT Pub. No.: WO88/03735
PCT Pub. Date: May 19, 1988

[30] Foreign Application Priority Data
Nov. 4, 1986 [JP] Japan .................... 61-262294

[51] Int. Cl.⁵ .................. G11B 7/00; H04N 5/781
[52] U.S. Cl. .................. 358/342; 358/3; 358/88; 358/341; 358/343
[58] Field of Search .............. 358/347, 335, 906, 909, 358/388, 91, 93, 97, 3, 92, 31, 342; 360/19.1, 10.2, 33.1

[56] References Cited
U.S. PATENT DOCUMENTS

| 4,001,493 | 1/1977 | Cone .................... 369/95 |
| 4,208,671 | 6/1980 | Ozawa et al. ............ 358/330 |
| 4,523,226 | 6/1985 | Lipton et al. ........... 358/88 |
| 4,641,178 | 2/1987 | Street .................. 358/3 |
| 4,706,117 | 11/1987 | Schoolman ............. 369/44 |
| 4,734,756 | 3/1988 | Butterfield et al. ..... 358/3 |
| 4,739,418 | 4/1988 | Iwahara et al. ......... 358/88 |
| 4,774,597 | 9/1988 | Harvey ................. 360/33.1 X |

FOREIGN PATENT DOCUMENTS

| 59-110071 | 11/1975 | Japan . |
| 50-143412 | 11/1975 | Japan . |
| 52-80008 | 7/1977 | Japan . |
| 55-1626 | 1/1980 | Japan . |
| 57-44381 | 3/1982 | Japan . |
| 58-137144 | 8/1983 | Japan ................... 369/95 |

Primary Examiner—Robert L. Richardson
Attorney, Agent, or Firm—Armstrong, Nikaido, Marmelstein, Kubovcik & Murray

[57] ABSTRACT

Two recording tracks (T1) and (T2) are formed in parallel with each other on a stereoscopic video disc record (D). Image information for a right eye and audio information are serially recorded on one recording track (T1). Image information for a left eye and audio information are serially recorded on the recording track (T2) at a synchronized timing with the image information for a right eye and the audio information recorded on the adjacent recording track T1. Information can be easily recorded on such steroscopic video disc record (D) in a manner that the image information for right and left eyes and the audio information are recorded at the same time by two recording beams. On the other hand, stereoscopic image information can be reproduced by reproducing respective recording tracks at the same time by two reproducing means. Furthermore, a normal two dimensional image information can be reproduced by reproducing either one of the recording tracks serially by one reproducing beam.

12 Claims, 6 Drawing Sheets

STEREOSCOPIC VIDEO DISC RECORD AND RECORDING AND REPRODUCING APPARATUS THEREFOR

FIELD OF THE INVENTION

The present invention relates to a stereoscopic video disc record and a recording and reproducing apparatus therefor and, more particularly, to a stereoscopic video disc record and a recording and reproducing apparatus therefor used in a stereoscopic image system for artificially creating a stereoscopic image using binocular parallax of a human being.

BACKGROUND OF THE INVENTION

Conventionally, a system has been implemented which creates a stereoscopic image artificially using successfully a visual function of a human being for stereoscopic image. Such stereoscopic image system is designed to pick up an image of the same object by two television cameras placed corresponding to human binocular parallax and to supply image information for right and left eyes obtained by these two television cameras, to right and left eyes of a viewer, respectively. A concrete method therefor is shown in Japanese Patent Laying-Open Gazette No. 160292/1985 in which image information for respective eyes are alternately supplied to a television receiver for each field, and in relation to the supplying operation, light shutters of eyeglasses (special eyeglasses for stereoscopic view on which light shutters are provided for left and right eyes, respectively) are activated alternately. Another method has been also considered in which image information for both eyes are displayed on a screen at the same time using beams having different planes of polarization and the displayed pieces of image information are viewed by polarizing eyeglasses (a polarization axis for a right eye coincides with a plane of polarization of image information for a right eye and a polarization axis for a left eye coincides with a plane of polarization of image information for a left eye).

The above described stereoscopic image system requires special eyeglasses because the image looks doubled on a displayed screen when viewed through a direct visual observation. In effect, however, viewers do not always have eyeglasses. Especially, when one television receiver is viewed by many people, such problem is likely to arise. Therefore, the stereoscopic image system is preferably designed not only to display a stereoscopic image but also to display a conventional TV image.

There are two types of the above described stereoscopic systems; one receives a broadcasting signal of a stereoscopic image to display the stereoscopic image, and the other reproduces stereoscopic image information recorded in a recording medium by a player to display the stereoscopic image. At present, the latter is more popular which reproduces the recording medium, especially the stereoscopic video disc record by video disc player to display the stereoscopic image. If the stereoscopic video disc record is used as an image information source, the stereoscopic video disc record is required to be adaptable to reproduction of both stereoscopic image information and two dimensional image information in order to satisfy the above described requirement, that is, compatibility between stereoscopic reproduction and plane reproduction.

A stereoscopic video disc record of VHD system is published in a journal, "Television Technique", pp. 20–23, published by Denshi Gijutsu Shuppan Kabushiki Kaisha (Electron Technology Publishing Co., Ltd.), Jan. 1, 1986, in which not only stereoscopic image information but also two dimensional image information can be reproduced. This stereoscopic video disc record appeared in the prior art is constructed to have image information recorded on spiral recording tracks. The recording tracks are divided into four recording regions by 90 degrees per rotation of the stereoscopic video disc record and the image information for a right eye or a left eye for 1 field is recorded on each recording region. The pieces of image information for right and left eyes to be reproduced at the same time in the same field are recorded in parallel in the recording regions which are next adjacent to each other in a radial direction of the stereoscopic video disc record. Therefore, if the next adjacent recording tracks in a radial direction are reproduced at the same time, the pieces of image information for a right eye and the image information for a left eye can be reproduced at a synchronized timing, whereby the stereoscopic image can be reproduced. On the other hand, if reproduction is performed by repeating jumps to the adjacent recording regions with the direction to jump being inverted for each ¼ rotation of the stereoscopic video disc record, the image information only for a right eye or only for a left eye can be reproduced in series, whereby a two dimensional image can be reproduced.

However, the above described stereoscopic video disc record requires many image memories and a large-scale editing system because original image information next adjacent in a time base direction cannot be recorded in that order.

Since the information is reproduced by a reproducing stylus, when the adjacent recording tracks are reproduced at the same time, two reproducing stylus must be placed very close, which makes it difficult to manufacture a pickup. In addition, in case of simultaneous reproduction, one track jump per revolution of the stereoscopic video disc record becomes indispensable with the result that a complicated mechanism to jump is required in the video disc player.

Furthermore, in case of simultaneous reproduction, since the pieces of image information for right and left are provided alternately for every two fields by two reproducing stylus, a mechanism for switching the right and left image information is necessary in the video disc player, which makes the structure complicated.

When the two dimensional image is reproduced using the above described stereoscopic video disc record, a track jump must be performed for every ¼ revolution, whereby a mechanism for the track jump becomes necessary in the video disc player. Therefore, it is not compatible with a conventional video disc player which is for reproduction of a two dimensional image and have no such a mechanism to jump.

In addition, since the recording tracks on the stereoscopic video disc record are divided into four recording regions by 90 degrees per revolution to record the image information as described above, the image information must be always recorded at constant angular velocity. However, the amount of information which can be recorded on the same record becomes less when recorded at constant angular velocity compared with that recorded at constant linear velocity. Particularly, in the stereoscopic video disc record in which two pieces of image information for right and left are recorded for one field, the recording time is limited to one half as compared with the video disc record in which conventional two dimensional image information is recorded, so that the method of recording at constant linear velocity is preferable because it can record more information.

DISCLOSURE OF THE INVENTION

It is, therefore, an object of the present invention to provide a stereoscopic video disc record having compatibility with the conventional video disc player for reproduction of two dimensional image in which both pieces of stereoscopic image information and two dimensional image information can be reproduced and those pieces of image information can be readily recorded.

It is another object of the present invention to provide a recording apparatus used for recording and a reproducing apparatus used for reproducing of the stereoscopic video disc record.

The stereoscopic video disc record in accordance with the present invention having image information recorded on a disc substrate in an optically readable manner, comprises a first recording track formed in a spiral fashion on the disc substrate and having the image information for a right eye recorded in series, and a second recording track formed in a spiral fashion and in parallel with the first recording track and having the corresponding image information for a left eye recorded serially at a synchronized timing with the image information for a right eye recorded on the adjacent first recording track.

Another stereoscopic video disc record in accordance with the present invention having image information recorded on a disc substrate in an optically readable manner, comprises a first recording track group comprising a plurality of recording tracks formed in a concentric fashion on the disc substrate and having image information for a right eye on each of the recording tracks, and a second recording track group comprising a plurality of recording tracks formed in a concentric fashion and in parallel with the recording tracks of the first recording track groups and having the corresponding image information for a left eye recorded at a synchronized timing with the image information for a right eye recorded on the adjacent recording tracks of the first recording track group.

The recording apparatus in accordance with the present invention which records the image information for right and left eyes and first and second audio information introduced from a recording information source on a disc substrate, comprises: first processing means for multiplexing one of the image information for a right and that for a left eye, the first audio information and identification information for identifying a recording track, and for converting the same to a signal capable of being recorded on one recording track, second processing means for converting the other one of the image information for a right and that for left eye and the second audio information, to a signal capable of being recorded on one recording track, first modulating means for modulating a first light beam corresponding to the output of the first processing means, second modulating means for modulating a second light beam corresponding to the output of the second processing means, and an optical system for arranging the first light beam modulated by the first modulating means and the second light beam modulated by the second modulating means in parallel and for condensing and irradiating the same on the disc substrate at the same time, whereby two recording tracks are simultaneously formed on the disc substrate.

A reproducing apparatus in accordance with the present invention is an apparatus for reproducing recorded information from a stereoscopic video disc record which has first and the second recording tracks formed in a spiral fashion and in parallel with each other, the first recording track having image information for a right eye and first audio information recorded in series, the second recording track having the image information for a left eye and second audio information recorded in series, and either the first or second recording track having identification information for identifying the recording track recorded thereon, the apparatus, comprising picking-up means for scanning either the first or second recording track by one light beam and for detecting light reflected therefrom, reproducing means for reproducing image signals and an audio signals in accordance with the detected output of the picking-up means, identification information detecting means for detecting whether identification information is contained in the output of the reproducing means or not, specifying means for specifying either the first or second audio information, and means for determining whether the audio information specified by the specifying means is being reproduced or not in accordance with the output of the identification information detecting means and giving a command to the picking-up means to jump to an adjacent recording track when the specified audio information is not being reproduced.

Another reproducing apparatus in accordance with the present invention is an apparatus for reproducing recorded information from a stereoscopic video disc record such as described above, comprising picking-up means for scanning adjacent first and second recording tracks simultaneously by two light beams and for detecting respective reflected lights, first reproducing means for reproducing any image signals and audio signals in accordance with the first detected output of the picking-up means, second reproducing means for reproducing image signals and audio signals in accordance with the second detected output of the picking-up means, identification information detecting means for detecting which of the outputs of the first or second reproducing means contains identification information, and means responsive to the output of the identification information detecting means for giving a command to the picking-up means that two light beams should jump to respective adjacent recording tracks when identification data is contained in the output on the predetermined side of the outputs of first and second reproducing means.

According to the present invention, respective image information for right and left eyes can be recorded sequentially in time on the respective recording tracks, so that recording can be carried out easily and a large number of image memories and a large scale editing system, which were necessary in the prior art, can be dispensed with.

According to the present invention, a structure of the reproducing mechanism is made simple because the corresponding image information for right and left eyes can be sequentially reproduced in a synchronous manner without jumping between the tracks.

According to the present invention, since the pieces of image information for right and left eyes are recorded in series on the separate recording tracks, if either one of the recording tracks is sequentially reproduced using a conventional video disc player for reproducing a two dimensional image, the plane image can be reproduced, which results in complete compatibility with the conventional video disc player.

According to the present invention, since it is not necessary to record image information at constant angular velocity like the conventional stereoscopic video disc record, it is possible to employ a method of recording, at constant linear velocity which is advantageous in regard to the amount of recording information.

According to the present invention, there is provided a recording apparatus for recording information to and a reproducing apparatus for reproducing recorded information from the above described stereoscopic video disc record.

BEST MODE FOR IMPLEMENTING THE INVENTION

Figure 1:
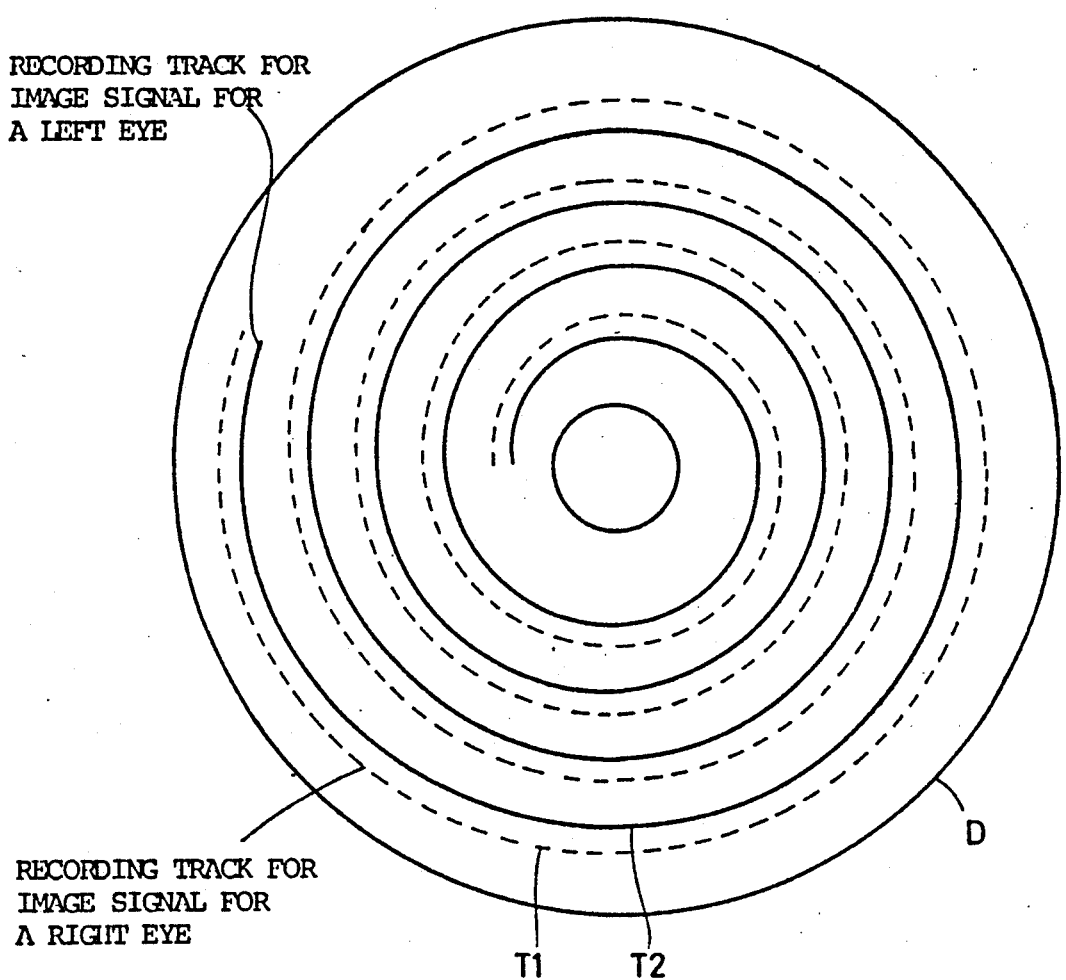
FIG. 1 is a plan view schematically showing a stereoscopic video disc record in accordance with one embodiment of the present invention.

FIG. 1 is a plan view schematically showing a stereoscopic video disc record in accordance with one embodiment of the present invention. First, referring to FIG. 1, a description is given of a structure of the stereoscopic video disc record in accordance with one embodiment of the present invention.

A stereoscopic video disc record D shown in FIG. 1 is characterized by recording tracks, as will be described below, and the structure other than those tracks may be the same as that of a conventional optical video disc record, that is, the video disc record on which information is read by scanning recording tracks by a laser beam. For example, a reflecting film such as metal is formed on a disc substrate and pits are formed thereon in accordance with recorded information. When a reproducing beam scans the tracks on which the pits are arranged, the light reflected therefrom is modulated depending upon the presence or absence or length of the pits. Therefore, the recorded information can be reproduced in accordance with the reflected light.

Two spiral recording tracks T1 and T2 of this embodiment are formed on the stereoscopic video disc record D. These recording tracks T1 and T2 are formed to be parallel to each other and the distance therebetween is kept constant. Pieces of image information for a right eye and first audio information are recorded at constant linear velocity on the recording track T1. On the recording track T2, the image information for a left eye and a second audio information are recorded at the same linear velocity as in the case of the first recording track. More specifically, the piece of corresponding right and left image information to be reproduced at the same time in the same field are recorded in a circumferential direction at a synchronized timing on both recording tracks T1 and T2. The completely same audio information or different audio information may be recorded on the first and second recording tracks T1 and T2. Examples of such case where pieces of different audio information are recorded are as follows, that is, a case where audio information of different languages are recorded, a case where right and left audio information for a stereosound are recorded on separate tracks, or a case where normal audio information and audio information for eye-handicapped people are recorded. Besides those cases, various audio information may be recorded by appropriately combining them, as necessary.

On the above described stereoscopic video disc record, if adjacent recording tracks T1 and T2 are reproduced at the same time by two reproducing beams (normally laser beams), image information for right and left eyes can be provided at a synchronized timing and, as a result, a stereoscopic image can be provided. On the other hand, if either of the recording tracks T1 or T2 is reproduced by one reproducing beam, a two dimensional image can be provided. At that time, since it is not necessary to jump between tracks, the image can be reproduced using the conventional video disc player for reproducing the two dimensional image. Therefore, the stereoscopic video disc record has complete compatibility between the video disc player for reproducing the stereoscopic image and the conventional video disc player for reproducing the two dimensional image. In addition, since the original image and audio information are serially recorded in a time base direction on both recording tracks T1 and T2 in the stereoscopic video disc record, no image memory nor editing system therefor is necessary in recording.

Furthermore, as a special case, the stereoscopic image can be reproduced using one reproducing beam on the stereoscopic video disc record. In that case, by repeating jumps between the tracks, while inverting its direction for every detection of a reproduced vertical synchronous signal, the image information for right and left eyes can be alternately provided sequentially in field order. Therefore, when the displayed screen is viewed using the above described eyeglasses with light shutters, the images for right and left eyes alternately displayed on the screen enter to right and left eyes, respectively, with the result that the stereoscopic image can be recognized.

Figure 2:
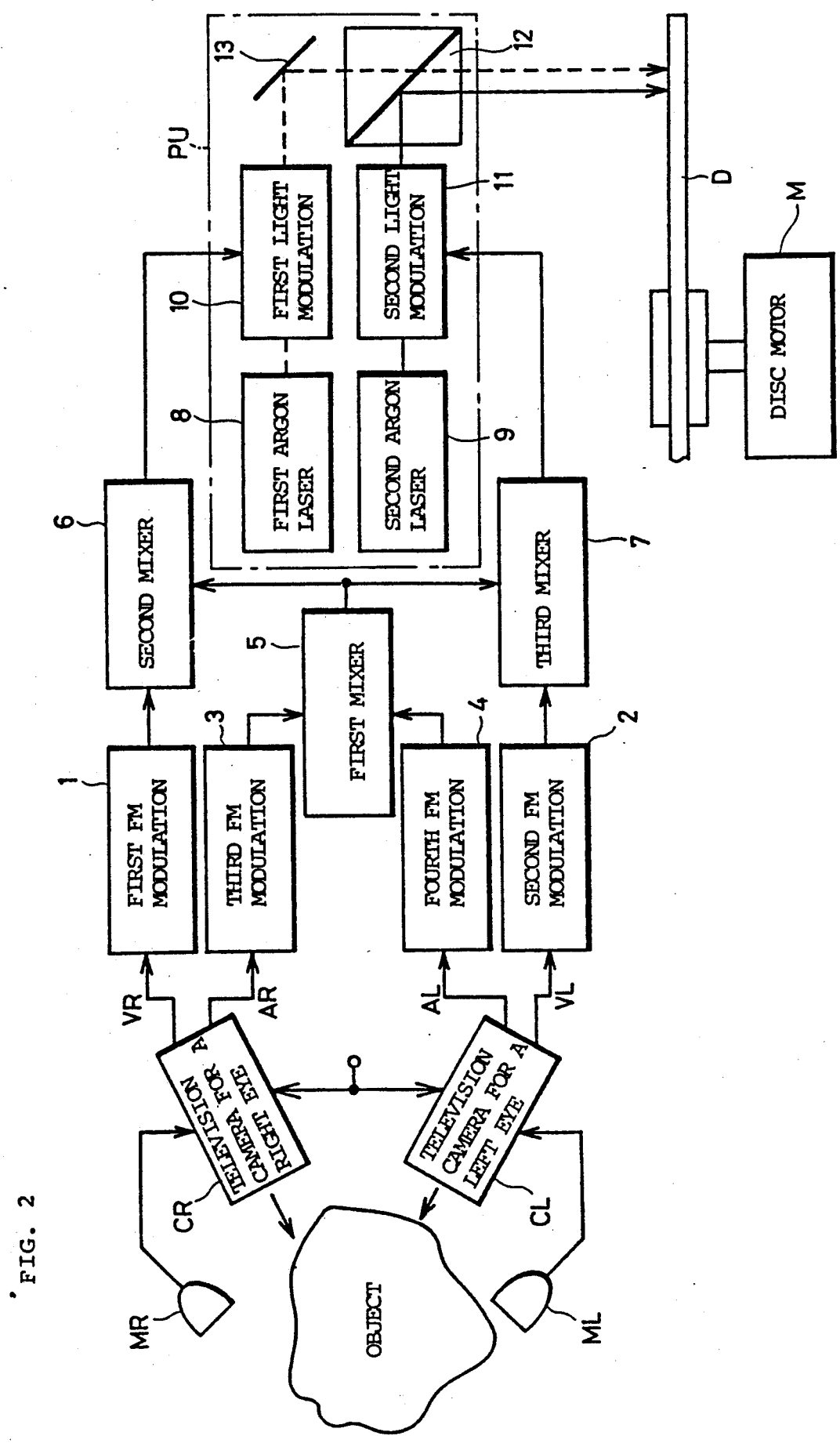
FIG. 2 is a block diagram showing one example of a video disc recorder used for recording on the video disc record shown in FIG. 1.

FIG. 2 is a block diagram showing one example of a video disc recorder used for recording on the stereoscopic video disc record shown in FIG. 1. Referring to FIG. 2, the video disc recorder comprises two television cameras CR and CL and external microphones MR and ML as recording information sources. More specifically, these two video cameras CR and CL provide image signals for right and left eyes VR and VL, respectively, by picking up an image of a common object from right and left directions (corresponding to an average binocular parallax of a human being), while being synchronously driven by a common external synchronous signal. At the same time, audio signals on right and left sides AR and AL derived from the external microphones MR and ML are also provided through respective cameras CR and CL. In addition, as another recording information source, a structure having two image signal reproducing apparatuses synchronously driven may be employed.

The above described image signals for right and left eyes VR and VL provided from the recording information source are inputted to first and second FM circuits 1 and 2 having a modulation band in common. The audio signals on right and left sides AR and AL are inputted to third and fourth FM modulation circuits 3 and 4, modulation bands of which are lower than those of the image signals and different from each other. Both modulation outputs of the third and fourth modulation circuits 3 and 4 are mixed at a first mixer 5. The outputs of the first FM modulation circuit 1 and the first mixer 5 are inputted to a second mixer 6 and mixed together therein. The outputs of the second FM modulation circuit 2 and of the first mixer 5 are inputted to a third mixer 7 and mixed together therein.

The outputs of the second and third mixers 6 and 7 are inputted to a first light modulator 10 and a second light modulator 11 in a pickup PU, respectively. The first light modulator 10 optically modulates the laser beam emitted from a first argon laser 8 in response to the output of the second mixer 6. The second light modulator 11 optically modulates the laser beam emitted from the second argon laser in response to the output of the third mixer 7. The modulated two laser beams are converged and irradiated close in a radial direction of the stereoscopic video disc record D through a optical system comprising a half mirror 13, a beam splitter 12 and the like. As a result, two spiral recording tracks are formed in parallel on the stereoscopic video disc record D. In addition, in this embodiment, the rotating speed of a disc motor M is controlled in accordance with a beam irradiating position of the pickup PU and the movement of the pickup PU is controlled in accordance with the amount of rotation of the disc motor M because the recording tracks are formed at constant linear velocity.

In a case where the stereoscopic video disc record is rewritable, the stereoscopic video disc record D shown in FIG. 1 can be provided directly from the video disc recorder shown in FIG. 2. In many cases, however, an original recording of the stereoscopic video disc record is made by the video disc recorder shown in FIG. 2 and a model is made from this original one to duplicate a number of stereoscopic disc records.

Figure 3:
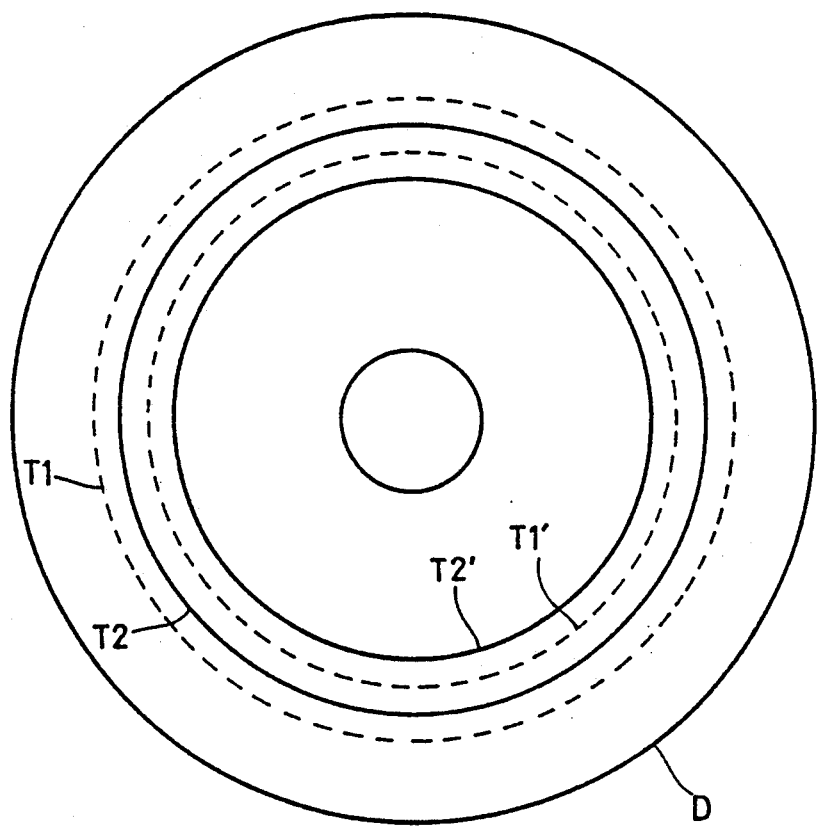
FIG. 3 is a plan view schematically showing a stereoscopic video disc record in accordance with another embodiment of the present invention.

The embodiment shown in FIG. 1 is appropriate when the stereoscopic image is recorded or reproduced as a moving picture. When the same is recorded and reproduced as a still picture, it is advantageous to employ a stereoscopic video disc record in accordance with another embodiment as will be described below. FIG. 3 is a plan view schematically showing a stereoscopic video disc record in accordance with another embodiment of the present invention. As will be apparent from FIG. 3, recording tracks are formed in a concentric fashion on a disc which rotates in a frame cycle in this embodiment. Image information for right and left eyes are alternately recorded on each of the recording tracks. The corresponding right and left image information to be reproduced simultaneously at the same time are recorded in parallel on respective adjacent recording tracks T1 and T2, T1' and T2', etc. Recording on the stereoscopic video disc record shown in FIG. 3 is carried out such that the disc motor M of the video disc record shown in FIG. 2 is rotated in a frame cycle and the movement of the pickup PU is stopped. In a case where the stereoscopic still pictures are recorded on concentric recording tracks as shown in this embodiment, it is also possible to sequentially record image signals for right and left eyes by the normal video disc recorder used for recording two dimensional image information.

The stereoscopic image information and the two dimensional image information can be reproduced using two reproducing beams and one reproducing beam, respectively, on the stereoscopic video disc record in accordance with the embodiment shown in FIG. 3 as in the case of the stereoscopic video disc record in accordance with the embodiment of FIG. 1. In the case where the stereoscopic image is reproduced using two reproducing beams, adjacent recording tracks may be read at the same time by two reproducing beams, On the other hand, in the case where the two dimensional image information is reproduced using one reproducing beam, either one of adjacent recording tracks may be read on which the corresponding image information for right and left eyes are recorded.

Meanwhile, the video disc recorder shown in FIG. 2 employs a method in which the same stereosound is multiplexed and recorded into respective image information for right and left eyes. Therefore, when the stereoscopic video disc record on which information is recorded by such video disc recorder is reproduced using the video disc player reproducing only one recording track, only the same audio information can be obtained even if either right or left recording track is specified and reproduced.

Figure 4:
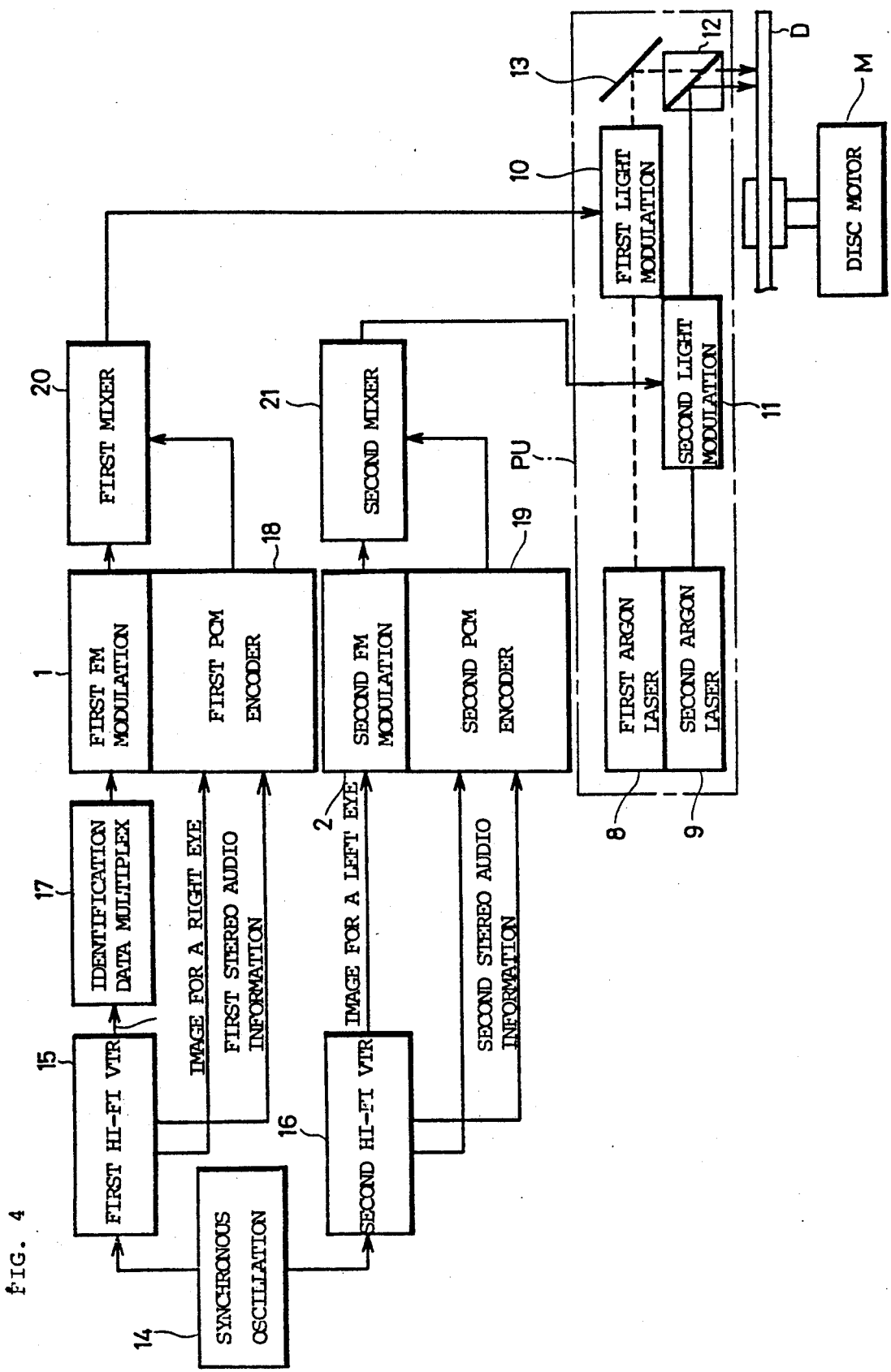
FIG. 4 is a block diagram showing another example of a video disc recorder used for recording on the stereoscopic video disc record shown in FIG. 1.

In a video disc recorder in accordance with another embodiment of the present invention shown in FIG. 4, different audio information are recorded on a recording track for image information for a right eye and on a recording track for image information for a left eye, respectively. Therefore, either one of two kinds of audio information can be selected even when only one recording track is reproduced, so that limited recording capacity can be used effectively. FIG. 4 shows, as a recording information source, first and second hi-fi VTR's 15 and 16 which are synchronously driven by a synchronization clock pulse from a synchronous oscillation circuit 14. The first hi-fi VTR 15 reproduces the information from a video tape on which image information for a right eye and a first language of stereo audio information (referred to as first stereo audio information hereinafter) are FM modulated and recorded in a frequency multiplexed manner. The second hi-fi VTR 16 reproduces the information from a video tape on which an image signal for a left eye and second language of stereo audio information (referred to as second stereo audio information hereinafter) are FM modulated and recorded in a frequency multiplexed manner. As described above, since the first and second hi-fi VTR's 15 and 16 are synchronously driven by the synchronization clock pulse from the synchronous oscillation circuit 14, both pieces of image information and both pieces of stereo audio information are simultaneously outputted in the same timing from each of the hi-fi VTR's. The image information for a right eye outputted from the first hi-fi VTR 15 is supplied to a identification data multiplex circuit 17. This identification data multiplex circuit 17 multiplexes identification data during a vertical blanking period of the image information. The output of the identification data multiplex circuit 17 is provided to a first FM modulation circuit 1 and FM modulated therein. On the other hand, the first stereo audio information outputted from the first hi-fi VTR 15 is provided to a first PCM encoder 18. This first PCM encoder 18 is a well-known PCM encoder used in audio recording on a so-called compact disc (CD), which converts the first stereo audio information to PCM audio data of a CD format. This PCM audio data has a frequency of 2 MHz or less. The PCM audio data A1 is applied to the first mixer 20 with the output of the first FM modulation circuit 1 and both are frequency-multiplexed therein. The output of the first mixer 20 is applied to a first light modulator 10 within a pickup PU.

Meanwhile, the image information for a left eye outputted from the second hi-fi VTR 16 is directly applied to a second FM modulation circuit 2 and FM modulated therein. Furthermore, the second stereo audio information outputted from the second hi-fi VTR 16 is applied to a second PCM encoder 19 and converted to the PCM audio data. The output of the second FM modulation circuit 2 and the above described PCM audio data are applied to a second mixer 21 and both are frequency-multiplexed therein. The output of the second mixer 21 is applied to a second light modulator 11 within the pickup PU.

A structure of the pickup PU shown in FIG. 4 is completely the same as that of the pickup PU shown in FIG. 2. Therefore, two spiral recording tracks T1 and T2 are formed in parallel on a stereoscopic video disc record D as well as the stereoscopic video disc record D shown in FIG. 1. In this case, the image information for a right eye, the first stereo audio information and the identification data are frequency-multiplexed and recorded on the recording track T1 and the image information for a left eye and the second stereo audio information are frequency-multiplexed and recorded on the second recording track T2.

Although with the video disc recorder shown in FIG. 4, the identification data is multiplexed only during the vertical blanking period of the image information for a right eye for identifying the recording track, different identification data may be multiplexed during the vertical blanking periods of both image signals for right and left eyes. In addition, instead of a method of time-division multiplexing data having the time base compressed, another method may be employed by which, pilot signals having different frequencies are frequency-multiplexed. As still another method, the identification data may be multiplexed to the PCM audio data, or frequencies of carriers of FM image information may be slightly different from each other.

Figure 5:
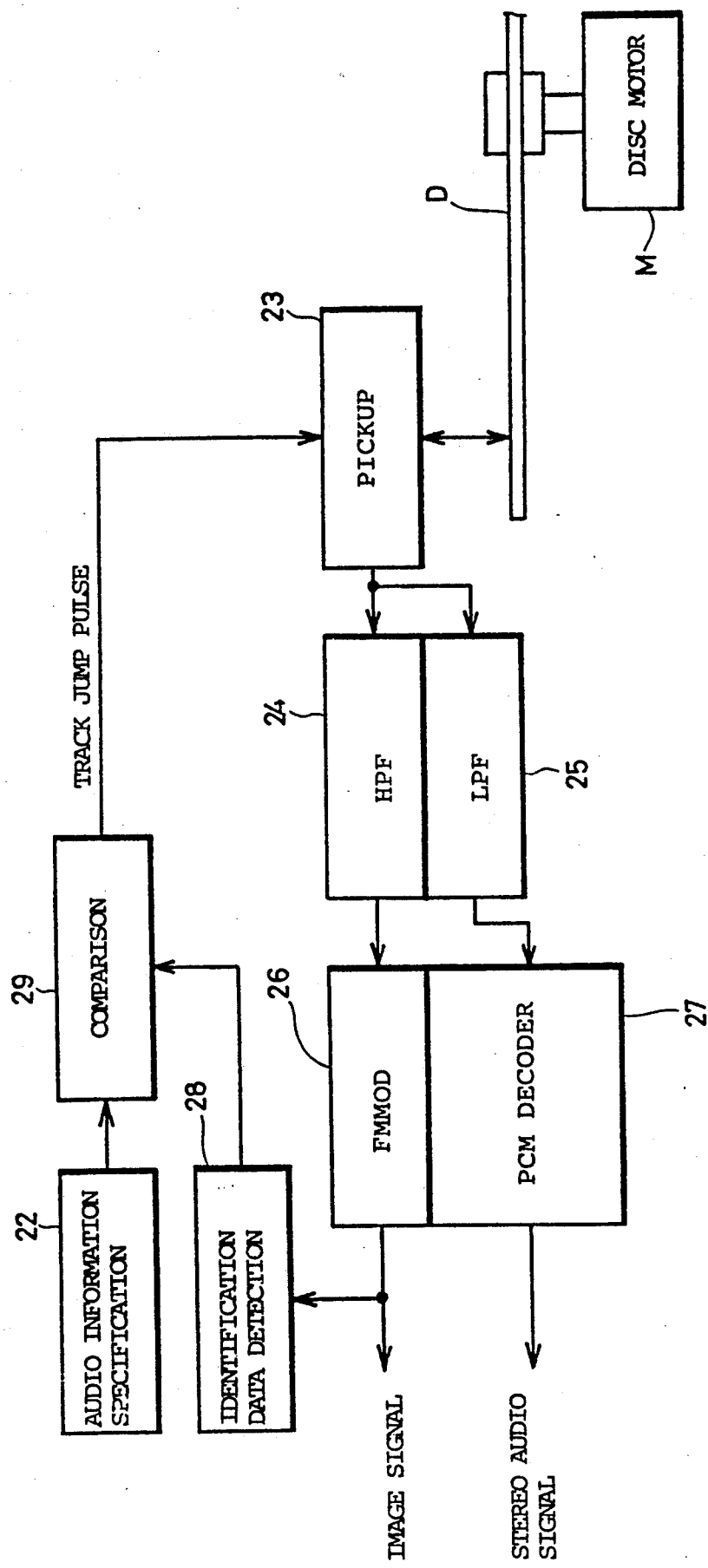
FIG. 5 is a block diagram showing a one-beam system video disc player for reproducing from the stereoscopic video disc record the information recorded by the video disc recorder shown in FIG. 4.

FIG. 5 is a block diagram showing one example of a video disc player which is suitable for reproducing from the stereoscopic disc record the two dimensional image information recorded by the video disc recorder shown in FIG. 4. The video disc player shown in FIG. 5 is structured to scan either recording tracks T1 or T2 of the stereoscopic video disc record D by one reproducing beam and to reproduce the two dimensional image information. In this regard, the structure is the same as that of the conventional video disc player for reproducing the two dimensional image. However, the video disc player of this embodiment is provided with audio information specifying means 22, and thus stereosound on any recording track can be reproduced in accordance with indication from this audio information specifying means 22. The audio information specifying means 22 comprises, for example two manual switches for selecting the stereosound. It is structured such that it outputs, for example a signal of high level, when the first stereo audio information is selected and outputs, for example a signal of low level, when the second audio information is selected. A reproducing pickup 23 reproduces recorded information by scanning either recording track T1 or T2 of the stereoscopic video disc record by one reproducing-beam. The output the reproducing pickup 23 is applied to a low-pass filter 25 as well as to a high-pass filter 24. The FM image information provided by the high-pass filter 24 is applied to a FM demodulation circuit 26 and demodulated to an original image signal. Furthermore, the PCM audio data provided from the low-pass-filter 25 is applied to a PCM decoder 27 and converted to an original stereo audio signal therein. The output of the FM demodulation circuit 26 is applied to an identification data detection circuit. The identification data detection circuit 28 determines whether identification data has been multiplexed or not in the image signal. If the data is multiplexed, it outputs a high-level signal and if the data is not multiplexed, it outputs a low-level signal. The output of the identification data detection circuit 28 is applied to a comparison circuit 29 along with the output of the audio information specifying means 22. The comparison circuit 29 compares the output of the audio information specifying means 22 with the output of the identification data detection circuit 28 to output a track jump pulse when these outputs do not coincide with each other. This track jump pulse is applied to the reproducing pickup 23. The reproducing pickup 23 maintains the trace of the present recording track when the track jump pulse is not applied. On the other hand, when the track jump pulse is applied, the reproducing pickup 23 jumps between tracks and reproduces the information on the adjacent recording track of the opposite side. More specifically, if the information on the recording track T1 is being reproduced, the pickup 23 jumps to the recording track T2 and if the information on the recording track T2 is being reproduced, the pickup 23 jumps to the recording track T1. This makes it possible to reproduce the stereo audio information specified by the audio information specifying means 22. In addition, the normal two dimensional image can be represented irrespective of whether the information for a right eye or the information for a left eye is reproduced, since the difference between two is only a slight difference of the image pickup angle.

Figure 6:
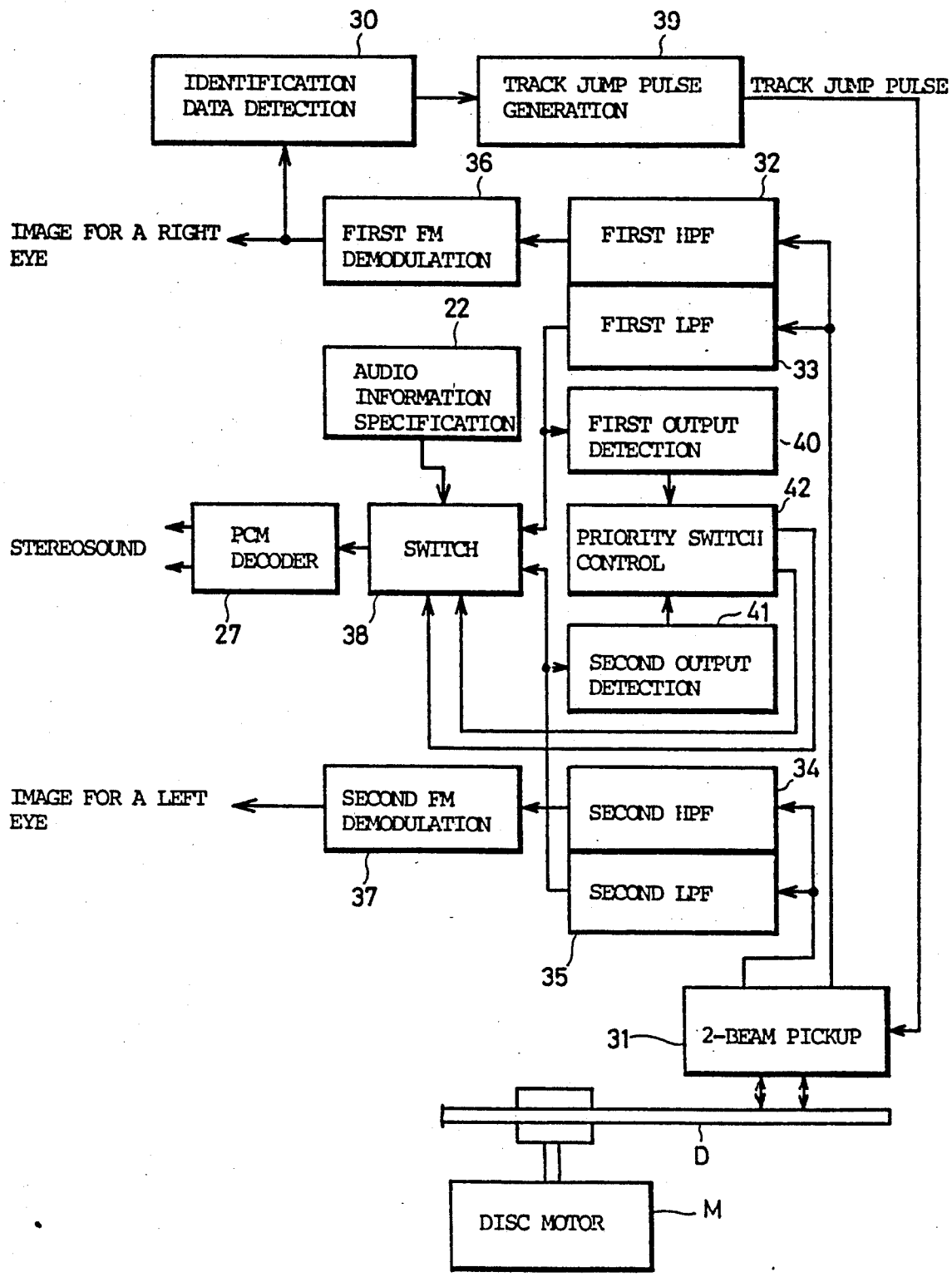
FIG. 6 is a block diagram showing a two-beam system video disc player for reproducing from the stereoscopic video disc record the information recorded by the video disc recorder shown in FIG. 4.

FIG. 6 is a block diagram showing one example of a video disc player suitable for reproducing the stereoscopic image information from the stereoscopic video disc record recorded by the video disc recorder shown in FIG. 4. The video disc player shown in FIG. 6 is structured such that it reproduces the recorded information on both recording tracks at the same time by scanning the adjacent recording tracks T1 and T2 on the stereoscopic video disc record D by two reproducing beams emitted from a two-beam pickup 31. In two reproducing outputs provided from the two-beam pickup 31, the reproducing output of the first recording track T1 is applied to the first high-pass filter 32 and the first low-pass filter 33 and the reproducing output of the second recording track T2 is applied to the second high-pass filter 34 and the second low-pass filter 35. The FM modulated image information for right and left eyes are provided from the high-pass filters 32 and 34, respectively and the the image information is FM demodulated in the first and second FM demodulation circuits 36 and 37, respectively. The outputs of the first and second FM demodulation circuits 36 and 37 are applied to a television receiver (not shown) as image signals for right and left eyes, respectively.

Meanwhile, when two reproducing beams of the two-beam pickup 31 scan the opposite recording tracks, respectively, the image signal for a left eye is outputted from the first FM demodulation circuit 36 and the image signal for a right eye is outputted from the second FM demodulation circuit 37. However, as described in FIG. 4, the identification data should have been multiplexed in the image information for a right eye. Therefore, the identification data detection circuit 30 detects whether the identification data has been multiplexed or not in the output of the first FM demodulation circuit 36 and when the identification data is not multiplexed, a track jump pulse generation circuit 39 generates a track jump pulse. This track jump pulse is applied to the two-beam pickup 31. Accordingly, the two-beam pickup 31 jumps for one recording track, causing two reproducing beams to jump from respective recording tracks presently being scanned to respective adjacent recording tracks. As a result, two reproducing beams scan corresponding recording tracks, respectively, so that the image signals for right and left eyes are outputted from the first FM demodulation circuit 36 and the second FM demodulation circuit 37, respectively.

The PCM audio data provided from the first low-pass filter 33 and the second low-pass filter 35 are inputted to a switching circuit 38. This switching circuit 38 selectively switches and output the PCM audio data from the first low-pass filter 33 and the PCM audio data from the second low-pass filter 35 in accordance with the output of the audio information specifying means 22. When the switching circuit 38 is switched to the first low-pass filter 33, the first stereo audio information is outputted and when it is switched to the second low-pass filter 35, the second stereo audio information is outputted. Therefore, in the embodiment of FIG. 6, the first and second stereo audio information can be arbitrarily switched and outputted by means of the audio information specifying means 22. The output of the switching circuit 38 is applied to the PCM decoder 27 and converted to the original stereo audio signal.

The PCM audio data should have been recorded on both recording tracks T1 and T2 of the stereoscopic video disc record D recorded by the video disc recorder shown in FIG. 4. In some cases, however, the, PCM audio data could be recorded on only one recording track. Therefore, the outputs of the first and second low-pass filters 33 and 35 are also inputted to the first and second output detection circuits 40 and 41, respectively. These first and second output detection circuits 40 and 41 generate outputs (for example, high-level outputs) when the level of the input signals are above the predetermined level. The outputs of the first and second output detection circuits 40 and 41 are applied to a priority switching control circuit 42. The priority switching control circuit 42 outputs a priority switching signal to the switching circuit 38 when a detection output is provided from only one, of the first and second output detection circuits 40 and 41, that is, when the PCM audio data is multiplexed on only one of the recording tracks T1 and T2. Accordingly, the switching circuit 38 selects and outputs the PCM audio data indicated by the audio circuit priority switching control circuit 42 regardless of the specification by the audio information specifying means 22. More specifically, the switching circuit 38 selects the output of the first low-pass filter 33 when the PCM audio data is outputted only from the first low-pass filter 33 and it selects the output of the second low-pass filter 35 when the PCM audio data is outputted only from the second low-pass filter 35.

The image signal for a right eye outputted from the first FM demodulation circuit 36 and the image signal for a left eye outputted from the second FM demodulation circuit 37 are inputted to, for example, two projection television receivers having different planes of polarization and represented on a common screen. The stereoscopic image can be recognized by viewing this screen through eyeglasses with filters for right and left eyes having different planes of polarization.

Applicable Field in the Industry

The present invention can be broadly applied to a stereoscopic image system artificially creating a stereoscopic image by presenting image information right and left eyes, respectively, with the information being deflected by binocular parallax.

What is claimed is:

1. A stereoscopic video disc record having two tracks of image information recorded in an optically readable manner on the same side of a disc substrate, comprising:
   a first recording track formed in a spiral fashion on said disc substrate and having continuous serially recorded optically readable image information for only a right eye; and
   a second recording track formed in a spiral fashion on said disc substrate adjacent to and in parallel with said first recording track and having corresponding optically readable image information for only a left eye continuously serially recorded in a timing synchronized with said image information for a right eye recorded on said first recording track.

2. A stereoscopic video disc record in accordance with claim 1, further comprising audio information recorded in an optically readable manner on said first and second recording tracks.

3. A stereoscopic video disc record in accordance with claim 2, wherein a first audio information and a second audio information are recorded on said first and second recording tracks, respectively.

4. A stereoscopic video disc record in accordance with claim 3, wherein identification information for identifying a recording track is recorded in an optically readable manner on at least one of said first recording track and said second recording track.

5. A stereoscopic video disc record in accordance with claim 1, wherein said image information for a right eye and said image information for a left eye are recorded on said first and second recording tracks, respectively, at constant linear velocity.

6. An apparatus for recording optically readable image information for right and left eyes, and first and second audio information which are provided from a recording information source, comprising:
   first processing means for multiplexing one of said image information for a right eye and said image information for a left eye, said first audio information and identification information for identifying a recording track, and for converting the same to a first output signal capable of being recorded on one recording track, second processing means for converting the other one of said image information for a right eye and said image information for a left eye, and said second audio information, to a second output signal which can be recorded on one recording track, first modulating means for modulating a first light beam in accordance with the first output signal of said first processing means, second modulating means for modulating a second light beam in accordance with the second output signal of said second processing means, and an optical system for condensing and irradiating the first light beam modulated by said first modulating means and the second light beam modulated by said second modulating means at the same time in adjacent parallel spiral recordings on the same side of said disc substrate, whereby two recording tracks of said first and second output signals, respectively, are formed at the same time on said disc subtract.

7. An apparatus for reproducing recorded information from a stereoscopic video disc record having first and second adjacent recording tracks formed in a spiral fashion in parallel with each other on the same side of a disc substrate, wherein image information for a right eye and first audio information are continuously serially recorded in optically readable manner on said first recording track only, image information for a left eye and second audio information are continuously serially recorded in optically readable manner on said second recording track only, and identification information for identifying a recording track is recorded in optically readable manner on either said first recording track or said second recording track, comprising:

picking-up means for scanning either said first recording track or said second recording track by one light beam and for detecting light reflected therefrom, reproducing means for reproducing an image signal and an audio signal in accordance with the detected output of said picking-up means, identification information detecting means for detecting whether said identification information is contained or not in the output of said reproducing means, specifying means for specifying either said first or second audio information, and means for determining whether audio information specified by said specifying means is being reproduced or not in accordance with the output of said identification information detecting means and for giving a command for said picking-up means to jump to the adjacent recording track when the specified audio information is not being reproduced, such that a monoptically recorded image signal and a selected audio information are reproduced by said reproducing means.

8. An apparatus for reproducing recorded information from a stereoscopic video disc record having first and second adjacent recording tracks formed in a spiral fashion in parallel with each other on the same side of a disc substrate, wherein complete image information for only a right eye image and first audio information are continuously serially recorded in an optically readable manner on said first recording track, complete image information for only a left eye image and second audio information are continuously serially recorded in an optically readable manner on said second recording track, and identification information for identifying a recording track is recorded in an optically readable manner on either said first or second recording track, comprising:

optical picking-up means for scanning said first and second recording tracks at the same time by two light beams and for detecting reflected lights output from respective tracks;

first signal reproducing means for reproducing an output of an image signal and an audio signal in accordance with a first detected output of said picking-up means;

second signal reproducing means for reproducing an output of an image signal and an audio signal in accordance with a second detected output of said picking-up means;

identification information detecting means for detecting on which output of said first signal reproducing means or said second signal reproducing means said identification information is contained; and means responsive to said detection by said information detecting means for giving a command to said picking-up means to cause said two light beams to jump to respective adjacent recording tracks.

9. An apparatus for reproducing in accordance with claim 8, further comprising:

specifying means for specifying either said first or second audio information, and switching means responsive to the output of said specifying means for selectively switching and providing audio information outputted from said first and second reproducing means.

10. An apparatus for reproducing recorded information from a stereoscopic video disc record having first and second adjacent recording tracks formed in a spiral fashion in parallel with each other on the same side of a disc substrate, wherein image information for only a right eye and optional first audio information are continuously serially recorded in an optically readable manner on said first recording track, image information for only a left eye and optional second audio information are continuously serially recorded in an optically readable manner on said second recording track, and identification information for identifying a recording track is recorded in an optically readable manner on either said first or second recording track, comprising:

optical picking-up means for scanning said first and second tracks at the same time to pick up information recorded thereon, and for providing first and second output signals corresponding, respectively, to said first recording track and second recording track recorded information;

first means for reproducing an image signal and an audio signal in accordance with said first output signal;

second means for reproducing an image signal and an audio signal in accordance with said second output signal;

identification information detecting means for receiving said first and second output signals and detecting on which of said first and second output signals said identification information is contained, and means responsive to said detecting for causing said picking-up means to jump between adjacent tracks;

means for specifying which of said first and second audio information shall be selected to provide an audio output, and audio switching means responsive to said specifying means for connecting a specified audio information to an audio output circuit; and an audio circuit priority switching control circuit for detecting if only one of said first and second output signals includes audio information, and for controlling said audio switching means to connect the output signal having said audio information to said audio output circuit regardless of the audio information specified by the specifying means.

11. A stereoscopic video disc record having two tracks of image information recorded in an optically readable manner on the same side of a disc substrate, comprising:

a first recording track formed in a spiral fashion on said disc substrate and having continuous serially recorded optically readable image information for only a right eye;

a second recording track formed in a spiral fashion on said disc substrate adjacent to and in parallel with said first recording track and having corresponding optically readable image information for only a left eye continuously serially recorded in a timing synchronized with said image information for a right eye recorded on said first recording track; and first audio information combined with said image information recorded on said first track and second audio information combined with said image information on said second track, such that said stereoscopic recording may be viewed monoptically by means of a one-beam disc player, whereby selection of one of said first and second recording tracks for display will permit display of a complete monoptical image and selective reproduction of one of said first and second recorded audio informations.

12. An apparatus for reproducing recorded information from a stereoscopic video disc record having first and second adjacent recording tracks formed in a spiral fashion in parallel with each other on the same side of a disc substrate, wherein complete image information for only a right eye image and first audio information are continuously serially recorded in an optically readable manner on said first recording track, complete image information for only a left eye image and second audio information are continuously serially recorded in an optically readable manner on said second recording track, and identification information for identifying a recording track is recorded in an optically readable manner on either said first or second recording track, comprising:

optical picking-up means for scanning said first and second recording tracks at the same time by two light beams and for detecting reflected lights output from respective tracks;

first signal reproducing means for reproducing an output of an image signal and an audio signal in accordance with a first detected output of said picking-up means;

second signal reproducing means for reproducing an output of an image signal and an audio signal in accordance with a second detected output of said picking-up means;

identification information detecting means for detecting on which output of said first signal reproducing means or said second signal reproducing means said identification information is contained;

means responsive to said detection by said information detecting means for giving a command to said picking-up means to cause said two light beams to jump to respective adjacent recording tracks;

specifying means for specifying either said first or second audio information; and switching means responsive to the output of said specifying means for selectively switching and providing audio information outputted from one of said first and second signal reproducing means.

* * * * *